Patented Sept. 5, 1939

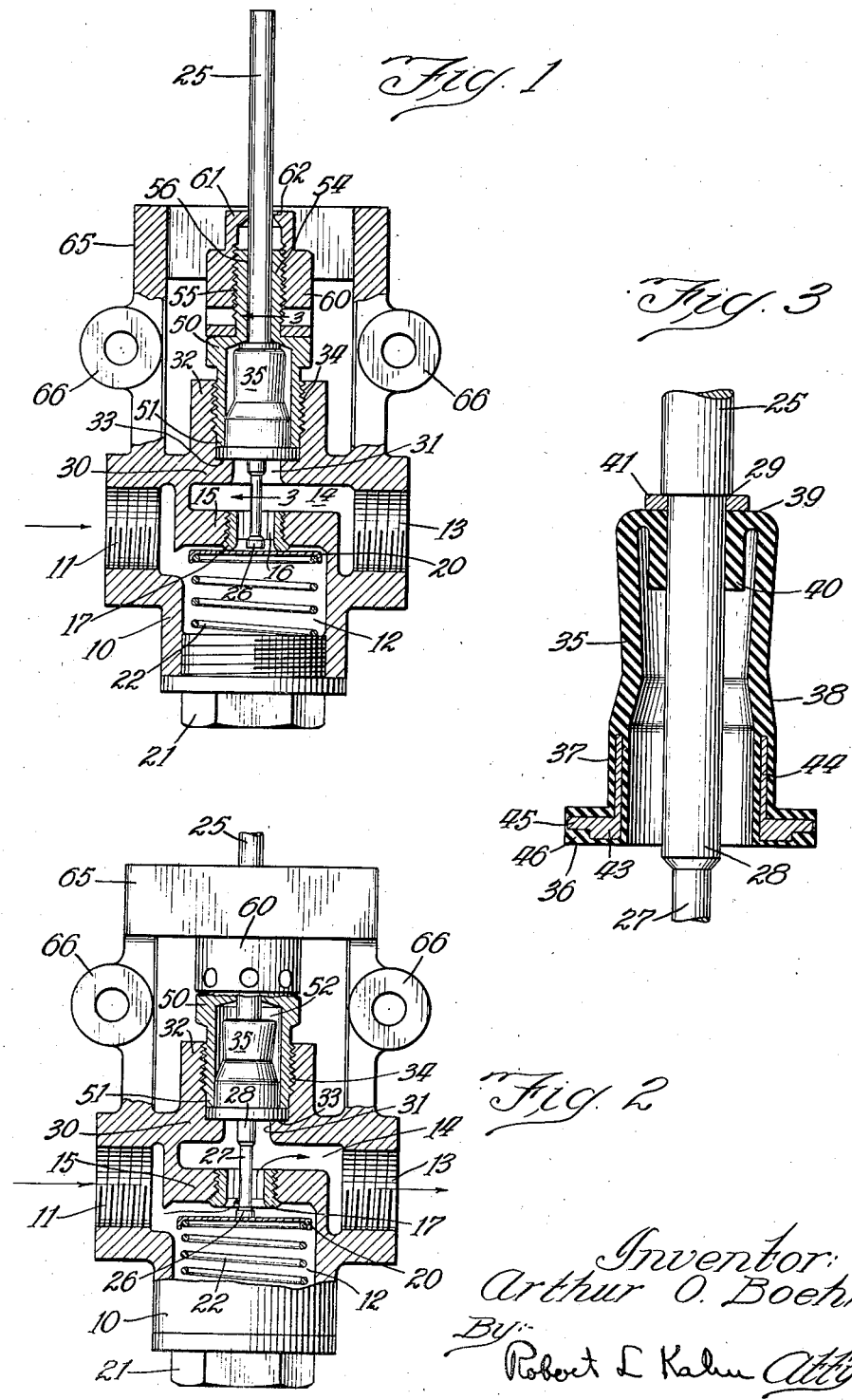

2,172,079

UNITED STATES PATENT OFFICE 2,172,079

VALVE

Arthur O. Boehm, Chicago, Ill., assignor to Perfection Gear Company, Harvey, Ill., a corporation of Illinois Application April 22, 1938, Serial No. 203,642

3 Claims. (Cl. 251—31)

This invention relates to valves and more particularly to means for sealing the movable portions thereof. Where valves are operated by some external means such as thermostatic or electric means, it is necessary for an operating rod to pass through the valve casing and extend into the valve interior. Thus, in the case of water valves, it has been customary to provide an expansible bellows of brass as a sealing means between the stationary valve casing and the movable push rod. In this way, the flexible bellows takes up the rod movement and at the same time seals the water against leakage to the outside. In order to accomplish this, it is necessary to solder the bellows at both ends to rigid gasket rings. Such bellows are capable of limited movement only and any repeated movements in excess of their rated travel limits tends to exceed the elastic limit of the brass and result in breakage. Furthermore, soldering creates serious problems. Thus the acid used must be thoroughly removed and this frequently is not done. With bellows walls having a thickness of the order of .004 inch, it is clear that a slight trace of acid will result in wall corrosion. Also, if certain chemicals are handled, the solder is affected and rendered porous in the course of time. In some cases, such as beverages, it is necessary to prevent the access of the beverage to solder, at least the common soft solder, to prevent contamination.

The bellows arrangement suffers from an additional drawback. Each bellows size is capable of limited movement only. Thus, for valves of different capacities, it is necessary to use different size bellows. It is highly desirable that the sealing means be flexible enough to permit one size in valves of graded capacities.

In general the invention contemplates the use of rubber as a sealing means. The rubber seal is suitably shaped to promote sealing upon increase of pressure. Preferably a metal cage encloses the rubber seal and is so shaped that only a predetermined and safe expansion of the rubber seal is permitted. The seal is preferably bell shaped and has a metal reinforcement molded in the base.

Referring to the drawing:

Figure 1 shows a sectional elevation of the valve in closed position.

Figure 2 shows the valve in open position.

Figure 3 is a sectional detail along 3—3 of Figure 1 showing the seal.

The valve comprises a casing 10 having an inlet 11 giving access to an inlet chamber 12. An outlet 13 communicates with an outlet chamber 14. Separating inlet chamber 12 from outlet chamber 14 is a partition 15 having an aperture 16. A valve seat 17 is disposed in partition 15 in any suitable fashion. Disposed within inlet chamber 12 for cooperation with valve seat 17 is a disc valve member 20. The bottom of casing 10 is machined to permit a threaded plug 21 to be inserted therein and between the inside end of plug 21 and valve member 20 a coil spring 22 is disposed. This is adapted to press the valve disc against the valve seat.

In order to open the valve, a push rod 25 is provided. This push rod is adapted to be actuated lengthwise thereof by any suitable means not shown. The push rod has an operating tip 26 adapted to actually bear against valve disc 20. Tip 26 is carried by a reduced rod portion 27 which extends through aperture 16 into the outlet chamber 14. Portion 27 of the rod is succeeded by a round smooth portion 28 which is smaller than portion 25 of the rod. A shoulder 29 forms the line of demarcation between portion 28 and 25 of the rod. As is clearly evident from the drawing, the operating rod passes through wall 30 of the casing. This wall 30 is suitably apertured at 31 to permit the operating rod free access into the outlet chamber 14. Wall 30 of the casing has an upwardly extending cylindrical portion 32 which is machined out to provide a circular shoulder 33 around apertured portion 31. Above shoulder 33 the wall is threaded at 34 as shown.

Disposed around portion 28 of the operating rod is a rubber sealing member generally designated by numeral 35 and having a general bell shape. The bottom of member 35 is formed as a flange 36 abutting against the upwardly extending cylindrical portion 37 of the sealing member. Thereafter, the sealing member tapers inwardly at 38 and extends upwardly to the top 39. Top 39 has a reentrant portion 40 extending inwardly and as is clearly evident in Figure 3, provides a long tubular portion adapted to hug part 28 of the rod. The top 39 of the sealing member is retained against upward displacement by means of a large washer 41 which is tightly driven around part 28 of the rod and is adapted to rest against shoulder 29 thereof. Obviously, this washer may be omitted and the contour of the rod itself be changed sufficiently to provide an abutting surface for the top of the sealing member.

Molded within the bottom of the sealing member is a metal member 43 having an upwardly extending tubular portion 44 within cylindrical portion 37 of the sealing member. A flange part 43 has its outer portion 45 reduced in thickness so that a substantial amount of rubber 46 is disposed below the metal. Preferably the rubber below the flange part 43 is very thin and, if necessary, may be omitted.

The flange part 36 of the entire rubber member is adapted to seat against shoulder 33 and be maintained in position by a cage member 50. This cage engages the threaded part 34 of the valve casing and at the bottom 51 is adapted to engage the flange portion of the sealing member. Inasmuch as the cage 50 and the valve casing are of steel or any other metal, it is clear that flange portion 43 of the metallic insert will take up the compression between the two. A substantial amount of rubber 46 below the outer portion of the metal insert will act as a gasket and aid in sealing.

It should be noted that cage member 50 is so shaped as to provide a chamber 52 which is somewhat larger than the rubber sealing member. The chamber is large enough to permit the rubber sealing member to expand due to pressure and to change its shape somewhat when the push rod is pressed downwardly to open the valve. However, the chamber 52 is small enough so that no dangerous unsupported stretching of the rubber sealing member due to pressure within the valve, can occur.

Cage member 50 has a top portion 54 extending upwardly and having the outer part thereof threaded at 55 while the inner portion 56 is machined to provide a smooth fit for rod 25. This portion of the cage functions as a guide for the rod.

A nut 60 may be provided threaded around threaded portion 55 of cage 50. This nut may have an upwardly extending portion 61 machined to provide a bearing 62 for push rod 25. Hence, the push rod 25 is supported against lateral movement and guided for longitudinal movement.

The entire valve casing 10 may have a shroud 65 extending upwardly around the entire push rod assembly and is adapted to be suitably supported by bolts in bosses 66.

When the rubber sealing member is expanded because of a pressure differential, the taper 38 promotes a lateral displacement of the rubber wall thus providing more head room for the top of the rubber member to fold over upon downward movement of the rod. At the same time, increased pressure on reentrant part 40 will tend to make a better seal. Upstanding part 44 of the metal tends to provide an extended bonding area with the rubber and relieves the rubber from strain at the bend.

During downward movements of the push rod 25 there will be a tendency to fold in the rubber sealing member with a corresponding flaring out of the intermediate portion due to pressure. Any pressure existing within the outlet chamber 14 is also present on the inside of the rubber sealing member and to that extent the rubber sealing member forms a flexible wall for the outlet chamber. The pressure within the sealing member will tend to force tubular part 40 of the sealing member tightly against rod part 28 so that the rubber will hug the metal. Due to the tight seal around the flange portion of the rubber and the extremely small area at the reentrant tubular portion 40, the sealing of the rubber will be as satisfactory as a metal bellows for practically all pressures commonly encountered. On the other hand, the cage 50 having the chamber 52 therein, tends to protect the rubber member against excessive dilation.

It has been found by actual experiment that the rubber member has a longer useful life than a bellows since the rubber has no fatigue and no overstress. It is assumed that the conditions under which the rubber works are such that no deterioration thereof is possible. Thus, certain gases like oxygen, tend to age rubber so that the life would be reduced. However, for all practical purposes, such as for water and many other liquids, the rubber sealing member is distinctly superior to the metal bellows and at the same time greatly reduces the manufacturing cost.

A further advantage lies in the fact that the same rubber sealing member may be used for a number of different valves having different operating ranges for the rod.

The stepped construction of the metal insert 43 serves to take up the stress of tightening cage 50 down upon it. The gasket portion of the rubber is prevented from being overstressed since the thick metal part permits a quick firm grip.

While the drawing shows the rod extending from the outlet chamber through the casing, it is understood that the valve may be reversed so that the rod may extend from the inlet chamber through the casing. In that event, suitable changes for insuring proper valve operation would be necessary. Inasmuch as such valves are old in the art, no further explanation is needed.

What is claimed is:

1. In a valve having a casing provided with inlet and outlet chambers separated by a valve opening, a valve member cooperating with said opening to control the valve, a longitudinally movoble push rod for operating said valve member and extending for one of said chambers through a portion of the casing wall to the exterior, a flexible tubular rubber sealing member having one end apertured for said rod and tightly gripping the same, said rubber member having the other end shaped to form a flange, a metal member molded therein and comprising a washer portion within the flange and a tubular portion within the rubber extending toward the one end for a distance, and a metal cage surrounding said rubber throughout the full extent thereof and carried by said casing and adapted to clamp the rubber flange down against the casing, said cage having enough clearance to permit a predetermined expansion of said rubber.

2. The structure of claim 1 wherein said washer portion of the metal in the rubber is stepped to provide an annular ring of metal as a compression washer and an annular ring of rubber as a gasket.

3. In a valve having a casing provided with inlet and outlet chambers separated by a valve opening, a valve member cooperating with said opening to control the valve, a longitudnally movable push rod for operating said valve member and extending from one of said chambers through a portion of the casing wall to the exterior, a flexible rubber sealing member having one end aperturned for said rod and tightly gripping the same, said rubber member having the other end shaped to form a flange, a metal member molded therein and including a washer portion within the flange, said washer portion being stepped in thickness to provide an annular ring of metal as a compression washer and an annular ring of rubber as a gasket and means for clamping said flange portion against the casing.

ARTHUR O. BOEHM.